INVENTORS.
W. JAMES STONE
JAMES P. DIEBOLD
BY
ROY MILLER
ATTORNEY.

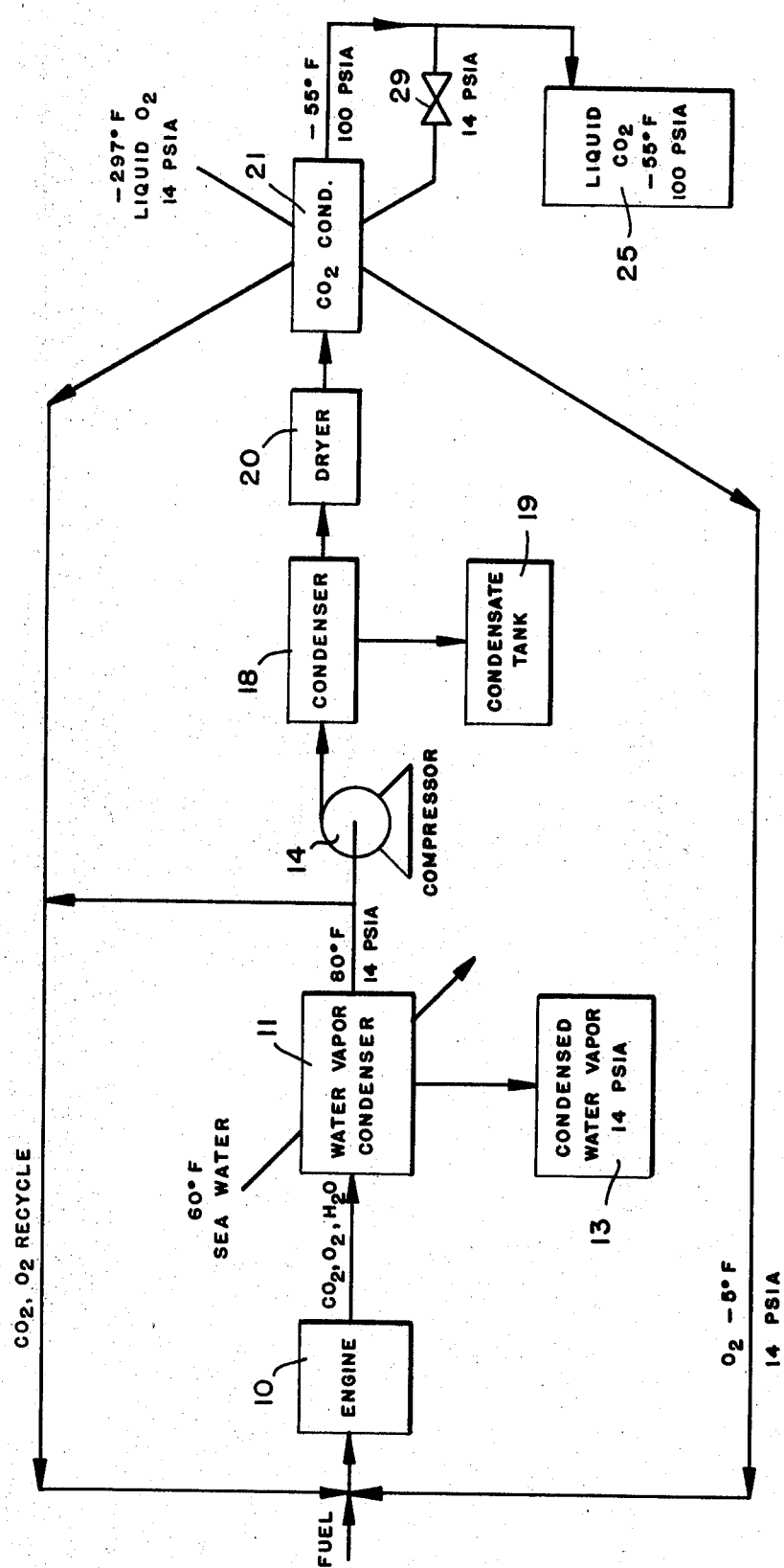

3,559,402
CLOSED CYCLE DIESEL ENGINE
W. James Stone and James P. Diebold, China Lake, Calif., assignors to the United States of America as represented by the Secretary of the Navy
Filed Apr. 24, 1969, Ser. No. 819,076
Int. Cl. F02n 25/06, 25/10
U.S. Cl. 60—31      2 Claims

ABSTRACT OF THE DISCLOSURE

A completely closed-cycle heat engine system for underwater application comprising a conventional heat engine and a system to condense the exhaust gases, including a water vapor condenser suitably connected to a compressor means and a heat exchanger, a dryer, a carbon dioxide condenser and tanks for storing liquid carbon dioxide and water.

GOVERNMENT INTEREST

The invention described herein may be manufactured and used by or for the Government of the United States of America for governmental purposes without the payment of any royalties thereon or therefor.

BACKGROUND OF THE INVENTION

In the past, the main power supplies for underwater application have been nuclear energy, batteries, turbines, and diesels with external exhausts. Underwater prime mover requirements were generally divided into two classes, torpedo propulsion, and large manned submarine propulsion. Nuclear energy power sources have been successful when adapted to large manned submarines to provide reliable long-duration operation. Torpedo propulsion, on the other hand, requires higher high-power output for relatively short durations of time. Power output in a torpedo is at a constant level in the propulsion system and is used only once. The torpedo system configuration must be adaptable to compact, small diameter, cylindrical packaging.

A more recent underwater propulsion requirement has developed for small manned deep-diving vehicles. Nuclear power is not now feasible for such small vehicles because of the bulk of the required shielding and other economic reasons. The small manned vehicle, unlike the torpedo, requires a source of power which can be used through many cycles of operation and which is highly flexible in power output. Greater latitude in power plant configuration is possible, due to the necessity of providing a crew compartment of adequate proportion. Desired duration between refueling stops varies from a few hours to days and will increase as life support system are improved.

A propulsion system may be considered as consisting of an energy storage device, such as a battery or propellant container, and an energy conversion device, such as an electric motor or heat engine. Weight and volume of the propulsion system is affected by a change in weight or volume of either device. An increase in duration, at a fixed power level, will increase the ratios of energy storage weight to energy conversion weight and of energy storage volume to energy conversion volume. As a result, manned vehicle performance is more sensitive to energy storage density and less sensitive to energy conversion device density than the torpedo.

Short-duration torpedo requirements have led to concentration on development of battery-powered electric motors and chemically-fueled turbines because of the inherent high power for unit weight and unit volume of the energy conversion devices. Development work on reciprocating energy conversion systems has been concentrated on unique engine configurations of the swash plate or barrel type in an effort to reduce weight and volume and to fit a small-diameter cylindrical package.

Some work has been done on semi-closed-cycle engines, but these engines still pump gaseous exhaust products such as carbon dioxide ($CO_2$) out into the water and thus are not applicable to deep submergence vehicles which operate at extreme depths and high pressure.

SUMMARY OF THE INVENTION

The present invention comprises an engine which burns a hydrocarbon fuel in oxygen and a system to condense the exhaust gases in order to make the entire unit independent of depth in its efficiency and power output. The system for condensing the exhaust gases comprises a water vapor condenser, a compressor, a heat exchanger, a dryer, a carbon dioxide condenser and tanks for storing liquid carbon dioxide and water. A hydrocarbon fuel, for example, diesel fuel, enters the engine with gaseous oxygen as an oxidizer. The mixture is burned in the engine and converted to carbon dioxide ($CO_2$) and water vapor.

In the present example it was necessary to use an engine mixture rich in $O_2$ to avoid rough erratic running and/or complete stopping of the engine. This caused $O_2$ to be cycled through the entire system along with the other exhaust products. After sufficient excess over stoichiometric quantities of $O_2$ were recycling through the system, the ratio of $O_2$ to fuel being fed into the system was reduced to stoichiometric. In the presence of excess $O_2$, the recycled portion of the exhaust gas consists primarily of $CO_2$ and $O_2$, rather than $CO_2$ alone. In addition, the exhaust gas going to the $CO_2$ condenser also has the same proportion of $O_2$ that enters the $CO_2$ condenser and is recycled back to the engine intake through a pressure relief valve.

The exhaust gases, $CO_2$, $H_2O$, and excess $O_2$, then enter a water cooled condenser and are cooled to about 80° F. which will condense most of the water vapor. After the exhaust gases are cooled and most of the water removed, part of the $CO_2$-$O_2$ mixture is recycled through the engine in order to dilute the oxygen concentration, thereby reducing the flame temperature, etc.

In order to form liquid rather than solid $CO_2$, the remainder of the exhaust is compressed to about 100 p.s.i.a. At this point, most of the remaining water vapor condenses out in a heat exchanger. The exhaust gas is then cycled through a dryer which removes any residual water. The gaseous $CO_2$ and $O_2$ mixture (now at approximately 100 p.s.i.a.) is then passed through a heat exchanger where liquid oxygen, at approximately —297° F. and 14 p.s.i.a., is used to cool and condense the $CO_2$ portion. The liquid oxygen is vaporized as it condenses the $CO_2$ and is then mixed with the $CO_2$ and $O_2$ dilutant for use in the engine. If the engine is run with an excess of oxygen some of this excess oxygen passes through the $CO_2$ condenser as vapor and is recycled.

BRIEF DESCRIPTION OF THE DRAWING

FIG. 2 is a closed system flow diagram.

DESCRIPTION OF THE PREFERRED EMBODIMENT

Figure 1:
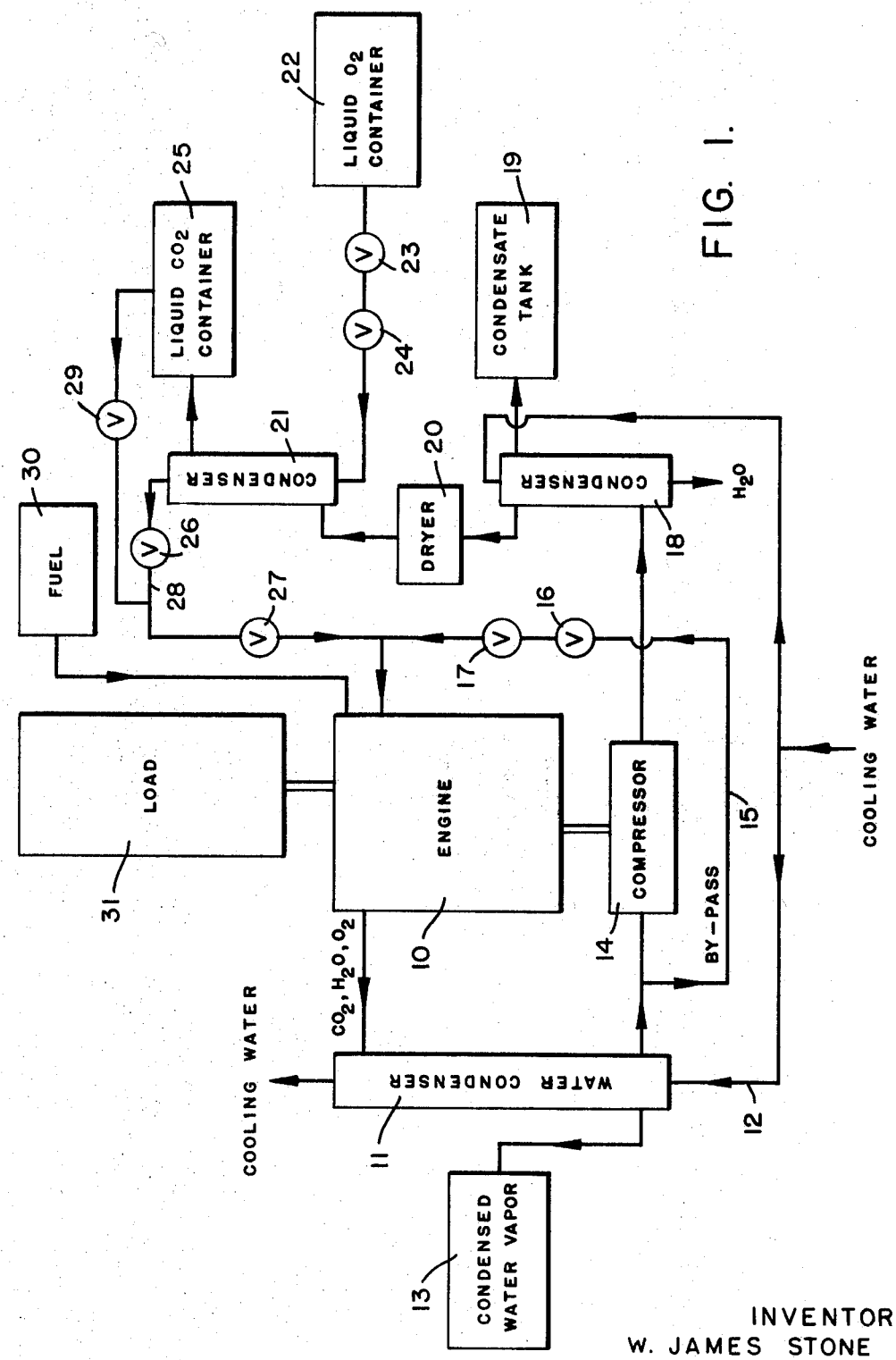
FIG. 1 is a block diagram of the present invention.

With respect to FIG. 1, the invention utilizes a compression ignition engine 10 which is a 3 H.P. Industrial Yanmar Model NT 65 L modified such that the entire system is closed. The exhaust gas, a mixture of $CO_2$, $H_2O$, and $O_2$, from engine 10 is taken directly to a water condenser 11 which has cooling water conducted therethrough on line 12. The condenser is constructed such that there is a smooth outer shell with an inner tube formed of Brown Fintube. The "annular" space between the tubes is where the exhaust gas is conducted. The condensate container 13 is actually part of the condenser 11. The cooling water passes through the condenser 11 and is exhausted.

The exhaust gas, with the major portion of the $H_2O$ removed, is then conducted directly to a compressor 14 which compresses the gas to about 100 p.s.i.a. The compressor is a model 220 De Vilbiss. A small amount of dried exhaust gas is by-passed around the compressor on line 15 through a pressure regulator valve 16 and a flow control valve 17 directly back to the input of the engine 10. The by-passed gas, largely, $CO_2$ and $O_2$ is used to dilute the gaseous oxygen to reduce the flame temperature.

From the compressor 14, the compressed gas is connected directly to another water condenser 18 which is constructed in the same fashion as condenser 11. The condenser 18 also has cooling water circulating therethrough and a condensate tank 19 which again, is part of the condenser 18. Again, cooling water is vented to the outside. The cooled exhaust gas is then conducted through a dryer 20 which removes any remaining amounts of water vapor. The dryer is a Beach Sta-Dri Filter Company Model 65-0.

The dry compressed exhaust gas, primarily $CO_2$ and $O_2$, is then conducted through the $CO_2$ condenser 21. Condenser 21 is constructed essentially in the same fashion as condenser 11 and 18 except that it is vacuum insulated and the heat transfer rate is controlled by raising or lowering the level of the liquid $O_2$ in the condenser. In this instance, liquid oxygen from a Lindy LC-3 container 22 is circulated through the condenser. Insterted in series between the container 22 and the condenser 21 is a shutoff valve 23 and flow regulating valve 24. The $CO_2$ vapor is condensed and taken off as liqud $CO_2$ and stored in container 25. Noncondensed $O_2$ which passes through the condenser 21 is allowed to bleed off on line 28 through a pressure regulator valve 29 and flow regulator valve 27. An optional method would be to run the cooled $O_2$ through condenser 21 on the liquid $O_2$ side to avoid heat losses as shown in FIG. 2. This bleed off oxygen is also conducted back to the input side for the air intake of the engine 10.

As the liquid $O_2$ is circulated through the condenser 21 it turns into a gas and the output gas is conducted through a pressure regulator valve 26 and flow regulator valve 27 back to the input side of engine 10 where it is combined with the by-pased $CO_2$ and $O_2$ to form the oxidative mixture for combustion.

Fuel for the engine is stored in a container 20 and flows to the injection system on the engine 10. The output of the engine 10 is used to drive a load 31.

The hydrocarbon fuel, diesel, enters the engine and is mixed with the gaseous oxygen diluted with $CO_2$. The mixture is burned in the engine and converted to $CO_2$ and water vapor. Back pressure on the engine is 14 p.s.i.a. The exhaust gases are cooled to aproximately 80° F. which will condense the main portion of the water vapor in the first condenser 11. Recycling the by-passed $CO_2$ and $O_2$ through the engine dilutes the oxygen concentration which in turn reduces the flame temperature.

The power requirement used to compress the exhaust gases is only in the neighborhood of 10-15% of that available from the engine, therefore there is approximately 85 to 90% of the power output of the engine available to drive the load 31.

FIG. 2 illustrates the closed system flow diagram for the present invention.

The present engine does not pump any gaseous exhaust into the surrounding water and is therefore, completely depth, i.e. pressure insensitive. In addition, the engine provides a highly flexible power output and may be used for many cycles of operation. Furthermore, the $CO_2$ exhaust is condensed by the liquid oxygen which is later mixed, as a gas, with the fuel to act as an oxidizer. The $CO_2$ condensation is a critical step in creating a closed system having a high efficiency as it allows the $CO_2$ exhaust to be easily stored on board. The condensed $CO_2$ occupies only a fraction of the volume as a liquid that it would as a compressed gas.

The closed cycle engine could be adapted for use in research, combat, or recreational submersibles (including torpedoes) as a means of propulsion or as a power supply for underwater fixed based stations. Instead of storing the liquid products on board they could be easily pumped out into the water if desired.

What is claimed:

1. A closed cycle internal combustion engine comprising;

a heat engine which produces an exhaust gas comprising water vapor and carbon dioxide;

condenser means for receiving said exhaust gas and cooling said gas to condense out said water vapor in the form of a liquid;

compressor means for receiving said exhaust gas and compressing the gas to substantially above atmospheric pressure;

other condenser means receiving said compressed exhaust gas for cooling the gas to condense out the carbon dioxide as a liquid; and by-pass means around said compressor means for by-passing a small amount of carbon dioxide to the inlet side of the heat engine.

2. A closed cycle internal combustion engine as set forth in claim 1 wherein;

the liquid $O_2$ used in the other condenser means is introduced to the heat engine as gaseous oxygen and wherein said by-passed $CO_2$ is used to dilute the pure gaseous oxygen.

References Cited

UNITED STATES PATENTS 2,187,074　1/1940　Caproni _____ 60—31
2,884,912　5/1959　Lewis _____ 123—119

DOUGLAS HART, Primary Examiner

U.S. Cl. X.R.

60—39.46; 123—119